(12) United States Patent
Bednarz et al.

(10) Patent No.: US 9,967,156 B2
(45) Date of Patent: May 8, 2018

(54) METHOD AND APPARATUS FOR CLOUD SERVICES FOR ENHANCING BROADBAND EXPERIENCE

(71) Applicant: Adaptive Spectrum and Signal Alignment, Inc., Redwood City, CA (US)

(72) Inventors: Philip Bednarz, Palo Alto, CA (US); Tuncay Cil, San Francisco, CA (US); Ardavan Maleki Tehrani, Stanford, CA (US); Leonardo Dagum, Redwood City, CA (US); Marc Goldburg, Redwood City, CA (US)

(*) Notice: Subject to any disclaimer, the term of this patent is extended or adjusted under 35 U.S.C. 154(b) by 0 days. days.

(21) Appl. No.: 14/763,486

(22) PCT Filed: Jan. 24, 2014

(86) PCT No.: PCT/US2014/012998
§ 371 (c)(1),
(2) Date: Jul. 24, 2015

(87) PCT Pub. No.: WO2014/116983
PCT Pub. Date: Jul. 31, 2014

(65) Prior Publication Data
US 2016/0006622 A1    Jan. 7, 2016

Related U.S. Application Data

(63) Continuation of application No. PCT/US2013/034697, filed on Mar. 29, 2013.
(Continued)

(51) Int. Cl.
*H04L 29/08* (2006.01)
*H04L 12/24* (2006.01)
(Continued)

(52) U.S. Cl.
CPC ..... *H04L 41/5032* (2013.01); *G06Q 10/0639* (2013.01); *G06Q 30/0201* (2013.01);
(Continued)

(58) Field of Classification Search
CPC .... H04L 67/306; H04L 63/00; H04L 65/1016
See application file for complete search history.

(56) References Cited

U.S. PATENT DOCUMENTS 6,704,303 B1 * 3/2004 Bowman-Amuah H04L 12/6418
370/352
8,086,491 B1 * 12/2011 Matz ..................... G06Q 30/02
705/14.49

(Continued)

FOREIGN PATENT DOCUMENTS

| CA | 2823295 | 7/2012 |
|---|---|---|
| CA | 2823295 A1 | 7/2012 |

(Continued)

OTHER PUBLICATIONS

International Search Report and Written Opinion for International Patent Application No. PCT/US2014/012998, dated May 20, 2014.
(Continued)

*Primary Examiner* — Raj Jain
(74) *Attorney, Agent, or Firm* — North Weber & Baugh LLP

(57) ABSTRACT

Described is a method for controlling a broadband service, the method comprising: collecting user behavior, usage data, and physical layer data associated with the broadband service; analyzing the collected data to determine whether a different broadband service can be offered to a user compared to existing broadband service; and providing the user a targeted offer according to the analysis. Described is also a method for recommending a service profile, the method comprising: receiving broadband data from an agent,
(Continued)

wherein the agent is executable on a computing device coupled to a LAN of a broadband subscriber; identifying a current service profile of the broadband subscriber; analyzing the received broadband data in view of the current service profile; determining a new service profile for the broadband subscriber according to the analyzed broadband data; and recommending the new service profile to the broadband subscriber and the broadband subscriber's service provider.

24 Claims, 9 Drawing Sheets

Related U.S. Application Data

(60) Provisional application No. 61/757,070, filed on Jan. 25, 2013.

(51) Int. Cl.
| | |
|---|---|
| G06Q 10/06 | (2012.01) |
| G06Q 30/02 | (2012.01) |
| G06Q 30/04 | (2012.01) |
| G06Q 50/30 | (2012.01) |
| H04L 12/54 | (2013.01) |
| H04L 12/46 | (2006.01) |
| H04M 3/00 | (2006.01) |
| H04L 29/06 | (2006.01) |
| H04L 12/26 | (2006.01) |

(52) U.S. Cl.
CPC ............ *G06Q 30/04* (2013.01); *G06Q 50/30* (2013.01); *H04L 12/4641* (2013.01); *H04L 12/5692* (2013.01); *H04L 41/5009* (2013.01); *H04L 41/5012* (2013.01); *H04L 41/5051* (2013.01); *H04L 67/306* (2013.01); *H04M 3/007* (2013.01); *H04L 43/087* (2013.01); *H04L 43/0888* (2013.01); *H04L 63/00* (2013.01)

(56) References Cited

U.S. PATENT DOCUMENTS

| | | |
|---|---|---|
| 2008/0281974 A1 | 11/2008 | Slothouber et al. |
| 2008/0288977 A1 | 11/2008 | Howcroft et al. |
| 2010/0278119 A1 | 11/2010 | Potkonjak |
| 2011/0125509 A1* | 5/2011 | Lidstrom ............... G06Q 30/02 705/1.1 |
| 2011/0131177 A1* | 6/2011 | Sheth .................. H04L 65/1016 707/609 |
| 2011/0243553 A1 | 10/2011 | Russell |
| 2011/0299550 A1* | 12/2011 | Karaoguz ............. G06Q 20/10 370/401 |
| 2012/0036051 A1 | 2/2012 | Sachson |
| 2012/0191536 A1 | 7/2012 | Chen et al. |
| 2013/0268357 A1* | 10/2013 | Heath .................... H04L 63/00 705/14.53 |
| 2014/0321298 A1* | 10/2014 | Chow .................. H04L 41/083 370/252 |
| 2015/0207720 A1* | 7/2015 | Dagum .................. H04L 41/32 370/252 |
| 2016/0006622 A1* | 1/2016 | Bednarz ............ G06Q 10/0639 370/252 |

FOREIGN PATENT DOCUMENTS

| | | |
|---|---|---|
| KR | 10-2012-0012824 | 2/2012 |
| WO | 2012096661 | 7/2012 |
| WO | WO-2012/105884 | 8/2012 |

OTHER PUBLICATIONS

First Office Action dated Dec. 1, 2016, for Korean Patent Application No. 10-2015-7022426.
Patent Exam Report for Australian Patent Application No. 2014209180, dated Dec. 4, 2015.
Search Report dated Aug. 18, 2016, for EP Patent Application No. 14743423.7.
Office Action dated Jul. 26, 2017, in Korean Patent Application No. 10-2015-7022426 (4pgs).

* cited by examiner

United States Patent US 9,967,156 B2

METHOD AND APPARATUS FOR CLOUD SERVICES FOR ENHANCING BROADBAND EXPERIENCE

CLAIM OF PRIORITY

This application is the U.S. National Phase application of International Application No. PCT/US2014/012998, filed Jan. 24, 2014, and claims the benefit of priority of International Patent Application No. PCT/US2013/034697 filed on Mar. 29, 2013, titled "METHOD AND APPARATUS FOR CLOUD SERVICES FOR ENHANCING BROADBAND EXPERIENCE," which claims priority to U.S. Provisional Application No. 61/757,070 filed Jan. 25, 2013, both of which are incorporated by reference in their entirety.

BACKGROUND

In current practice, Wide Area Network (WAN) and/or Local Area Network (LAN) performance information is not centrally analyzed by a communication device coupled to such networks to account for information such as topological information, geographical information, user's network usage pattern, quality of network connection, time, throughput, user behavior, usage data, etc. Accordingly, user behavior associated with user's broadband service may not be contextually analyzed by any central system to provide a targeted offer to the user of the broadband service according to its broadband service usage. A lack of targeted offer may result negatively in terms of customer (user) satisfaction of the broadband service.

Lack of a central analysis may also result in the communication devices (e.g., a smart phone, computer, a router, etc.) operating with lower performance than otherwise possible because the communication devices have no means for knowing performance data that can be used to intelligently assess and manage performance of the communication device and/or network connection.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
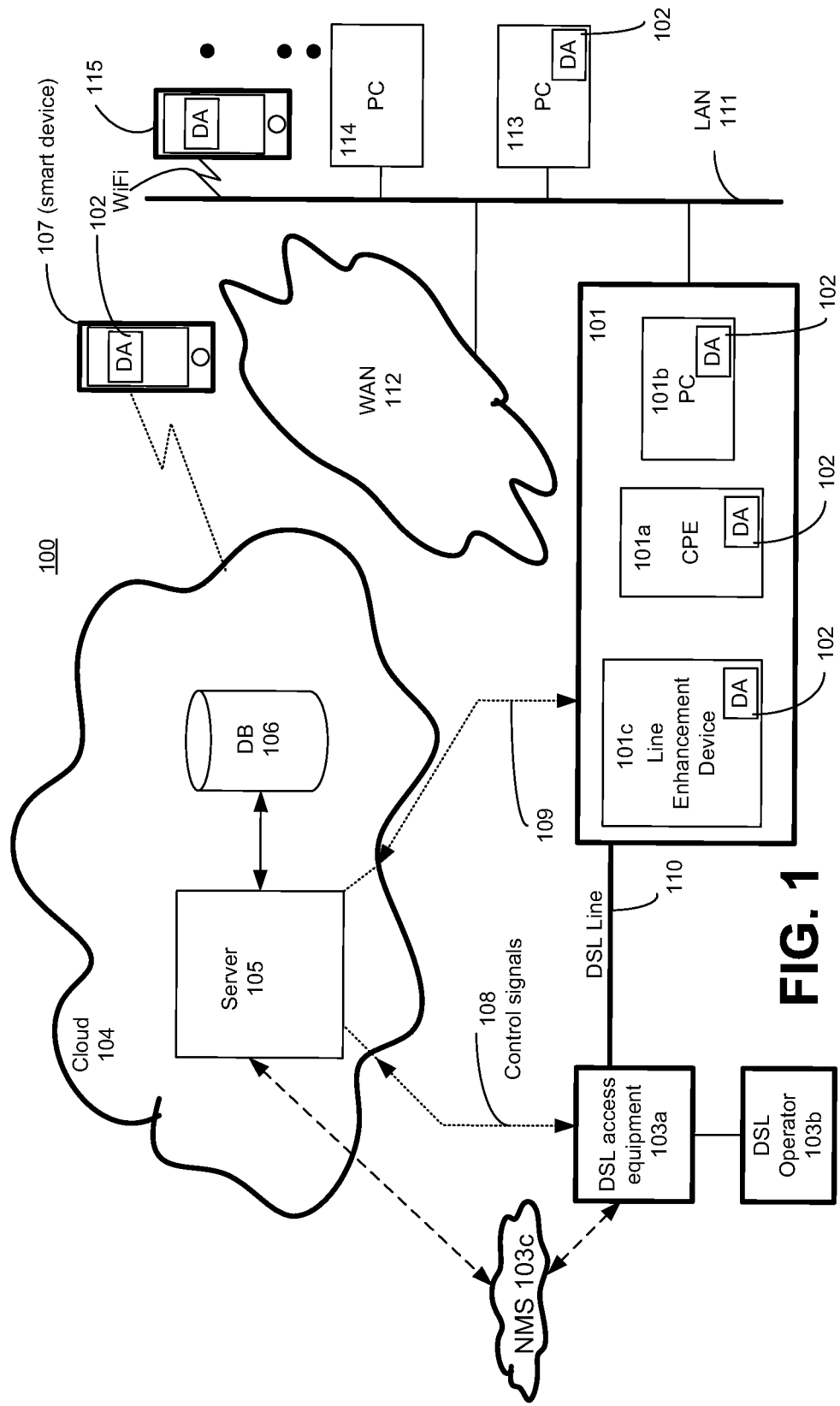
FIG. 1 illustrates a communication network with some or all communication devices having a downloadable agent to assist with performance analysis, rewarding a user of a broadband service, recommending new profiles to broadband service providers and/or subscribers, providing instructions and commands according to statistical analysis for at least one of the broadband subscriber and broadband subscriber's service provider, according to one embodiment of the disclosure.

One of the problems with current communication systems is that information about the communication device and communication device performance inside the local area network (LAN) is generally available to other devices on the LAN, however not available to machines outside the LAN; i.e., the wide area network (WAN), or the cloud. In order to overcome this and other problems, the embodiments of this disclosure describe an agent (also called downloadable agent) which is placed inside the LAN, where the agent collects data on behalf of the cloud or WAN-based server and then transfers that data to the cloud or WAN-based server for analysis. Such an embodiment allows collection of information on all devices centrally for a comprehensive analysis.

In one embodiment, comprehensive analysis allows the cloud or WAN-based server to compare collected user behavior and usage data with benchmark data. In one embodiment, cloud or WAN-based server provides user of the broadband service a targeted offer when the collected user behavior and usage data exceeds a threshold associated with the benchmark data. In one embodiment, benchmark data is determined by analyzing user behavior and usage data of other users in a common geographical area.

In one embodiment, user behavior data includes one or more of online activities and mobile activities. In one embodiment, online activities include data collected via the broadband service which is a digital subscriber line (DSL) broadband service. In one embodiment, the targeted offer includes at least one of; Over The Top (OTT) services including one or more of movies, TV shows or games provided by a third party vendor; recommendations for improving performance of a broadband link associated with the broadband service; higher throughput for the broadband link associated with the broadband service, etc.

In one embodiment, cloud or WAN-based server provides user of the broadband service a reward in response to analyzing the collected data. In one embodiment, the reward includes at least one of: reward points to build credit towards future bill; reward credit for using the broadband service; reward miles towards an airline miles program, etc.

The embodiments also describe a method performed by a downloadable agent for collecting information associated with a communication device and then sending the collected information to another machine for analysis. In one embodiment, other interfaces of the communication device may be used in conjunction or independent of the downloadable agent to collect information associated with the communication device and then to send that collected information to another machine for analysis.

In one embodiment, the downloadable agent is executable on a computing device coupled to a LAN of a broadband subscriber, wherein the LAN is coupled by another device to a WAN. In one embodiment, the method further comprises transmitting the WAN performance information to a machine. In one embodiment, the downloadable agent may be executable on a variety of different computer platforms and operating systems.

In one embodiment, the other machine is a server in a cloud which has access to information related to many communication devices and can use that information to generate a performance report for the communication device. In one embodiment, the server in the cloud does not have access to information of the communication devices in the absence of the downloadable agents. The downloadable agent, that may be downloaded on a user's browser or installed on the communication device, provides the server access to the information associated with the communication device. In one embodiment, the downloadable agent receives the report. In one embodiment, the report can be used to enhance the performance of the communication device.

In one embodiment, comprehensive analysis allows the cloud or WAN-based server to recommend a service profile to a broadband subscriber and the broadband subscriber's service provider. In one embodiment, the server receives broadband data from an agent, wherein the agent is executable on a computing device coupled to a LAN of a broadband subscriber. In one embodiment, broadband data is at least one of WAN performance information or LAN performance data. In one embodiment, a current service profile of the broadband subscriber is identified. In one embodiment, the received broadband data in view of a current service profile is analyzed. In one embodiment, a new service profile is determined for the broadband subscriber according to the analyzed broadband data. In one embodiment, the new service profile is recommended to the broadband subscriber and the broadband subscriber's service provider.

In one embodiment, the cloud, server, or broadband subscriber's service provider dynamically adjusts a service profile of the broadband subscriber with the new service profile. In one embodiment, the new service profile includes a turbo service with higher data rate or throughput than a previous server profile of the broadband subscriber. In one embodiment, the new service profile is accessed by one of: TV, personal computer, tablet computing device, mobile device or OTT services.

The term "Local Area Network" (LAN) generally refers to a computer or communication network that interconnects computers or communication devices in a limited area such as a home, school, computer laboratory, or office building using network media.

The term "Wide Area Network" (WAN) generally refers to a telecommunication network that covers a broad area (i.e., any network that links across metropolitan, regional, or national boundaries) compared to the limited area covered be a LAN.

In one embodiment, the machine (e.g., a server in a cloud) is operable to: store the WAN performance information in a database associated with the machine, analyze the WAN performance information to generate an analysis result; and report the analysis result to at least one of the broadband subscriber and the broadband subscriber's service provider. In one embodiment, the broadband subscriber and/or the broadband subscriber's service provider analyzes the report and adjusts various performance parameters associated with the communication device or the networking devices with which it communicates to enhance the performance of the communication.

The term "performance" generally refers to network throughput (e.g., TCP/UDP), latency, jitter, connectivity, error rates, power consumption, transmit power, etc. Improving performance of the communication system includes increasing throughput, reducing error rate and latency, improving (i.e., reducing) jitter, reducing power consumption, etc. for the communicating system. The term "TCP" stands for Transmission Control Protocol. The term "UDP" refers to User Datagram Protocol. The term "successful" generally refers to an indication suggesting safe receipt of a packet that is often confirmed by ACK (acknowledge) message packet. In another embodiment, operational data such as error counts, retransmission counts, modulation, signal strength, etc. are used to estimate the performance and throughput of the communications link.

In one embodiment, a user of a communication device installs (downloads) an agent on their communication device, for example, personal computer, tablet computer, laptop, network gateway, smart phone, smart device, computer, DSL access equipment, router, etc., so that the communication device is able to collect performance related information for analysis by another machine (e.g., a server on a cloud) and then receive at least one of several statistical and commercial analysis including throughput and other measures of communications performance; availability of higher bandwidth for operating a communication device/link (e.g., DSL) service; purchase information (or service product information) for improving communication device/link (e.g., DSL) service performance; or utilization information for optimizing a consumers' communication device/link (e.g., DSL) service cost. Such downloadable agent allows for customized enhancement of user experience with a communication device by enhancing the communication device's or link's performance.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" generally refers to two or more elements which are in direct contact (physically, electrically, magnetically, electromagnetically, optically, etc.). The term "coupled" generally may also refer to two or more elements that are not in direct contact with each other, but still cooperate or interact with each other.

Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 illustrates a communication network 100 with some or all communication devices having a respective downloadable agent (DA) to assist with performance analysis, according to one embodiment of the disclosure.

In one embodiment, communication network 100 comprises a local network 101 (e.g., a network at home) having Customer Premises Equipment (CPE) 101a and a personal computer (PC) 101b. In one embodiment, LAN 101 optionally comprises a line enhancement device 101c which is any device coupled to DSL 110 that improves the quality or performance on DSL 110. In one embodiment, line enhancement device 101c is a standalone device. In another embodiment, line enhancement device 101c is integrated with CPE 101a. In one embodiment, one or more devices of LAN (e.g., home LAN) 101 are operable to communicate with server 105 via Internet 109 (via wired or wireless connections).

In one embodiment, communication network 100 comprises a server 105 coupled to a database 106. In one embodiment, server 105 and/or the database 106 reside in a cloud 104.

The term "cloud" refers generally to cloud computing which is the delivery of computing and storage capacity as a service to a community of end-recipients. The term "cloud" is indicated with use of a cloud-shaped symbol 104 as an abstraction for the complex infrastructure it contains in system diagrams. Cloud computing entrusts services with a user's data, software and computation over a network. In one embodiment, server 105 resides in cloud 104 and is operable to perform complex analysis (e.g., statistical) based on information collected from other communication devices via the Internet.

In one embodiment, communication network 100 comprises DSL access equipment 103a (also called a DSL access network, or DSL node) which is operable to communicate with CPE 101a via DSL line 110. In one embodiment, DSL access equipment 103a comprises a DSLAM (digital subscriber line access multiplexer). In one embodiment, DSL access equipment 103a comprises a CO (central office). In one embodiment, DSL access equipment 103a receives control signals 108 from server 105 that instruct a DSL operator 103b about ways to improve performance of its customers e.g., CPE 101a, etc.

In one embodiment, control signals 108 include at least one or more of signals or commands related to: power, for example, transmit power, spectrum control, for example, Power Spectral Density (PSD) mask, margin, data rate, latency/delay, coding, for example, Forward Error Correction (FEC) coding.

In one embodiment, cloud 104 communicates with DSL access equipment 103a via Network Management System (NMS) 103c. The NMS 103c may represents any management system used by the DSL network operators or DSL service providers to manage the DSL lines and their network. In one embodiment, operational data can be collected from NMS 103c of the service provider. In one embodiment, NMS 103c is communicatively coupled to DSL modem pairs.

In one embodiment, server 105 is operable to access external communication devices (external to cloud 104) through cloud-based applications via a web browser or mobile application. In the embodiments, DA 102 is operable to communicate with resources (e.g., server 105, database 106) of cloud 104. In one embodiment, DA 102 may be downloaded from any platform e.g., a disk, memory stick, web browser, web server, etc. In one embodiment, DA 102 associated with a communication device executes on an Internet browser (e.g., Safari®, Netscape®, FireFox®, Internet Explorer®, etc.). In one embodiment, DA 102 associated with the communication device is accessible remotely via the Internet.

In one embodiment, DA 102 is operable to execute on multiple computing platforms with different operating systems. For example, DA 102 may operate on operating systems including Android, Berkley Software Distribution (BSD), iOS, GNU/Linux, Apple Mac OS X, Microsoft Windows, Windows Phone, and IBM z/OS. In one embodiment, DA 102 is operable to execute in a virtual machine (VM). A VM is a software implementation of a machine (e.g., a computer) that executes programs like a physical machine. Examples of virtual machines include a Java Virtual Machine and the previously mentioned operating systems executing in VMWare, Virtual Box or the like. In one embodiment, DA 102 may receive automatic updates to keep the application up to date with the latest features. In one embodiment, the downloadable agent is dynamically downloaded to the computing device.

The term "dynamically" generally refers to automatic action. The term "dynamically" also refers to downloading of an agent by a computing device on-demand and prior to use of an agent. A dynamically downloaded agent may be deleted from the computing device following the use of that agent. The term "dynamically" also refers to automatic (i.e., with little or no human interaction) adjusting of service profile of a broadband subscriber with a new service profile.

In one embodiment, communication network 100 comprises a wireless device, for example, a smart device 107 (e.g., smart phone, tablet, etc.) with a DA 102. In one embodiment, DA 102 is operable to review an analysis report generated by server 105 for any of the communicating devices it has authorization to access.

In one embodiment, server 105 is operable to receive WAN performance information from a DA 102. In one embodiment, DA 102 is executable on a computing device (e.g., 101a-b, 107, 113) coupled to LAN 111 of a broadband subscriber. In one embodiment, LAN 111 is coupled by another device to WAN 112. In one embodiment, a DSL modem and a home gateway couple LAN 111 to WAN 112. In one embodiment, the DSL modem and home gateway are integrated into a single enclosure.

In one embodiment, DA 102 associated with the communication device collects data locally within the communication device and then periodically sends the collected data to server 105. In one embodiment, DA 102 may wait for certain conditions or thresholds to be met before sending all collected data to server 105.

In one embodiment, conditions and/or thresholds are related to a function of the type of data collected. For example, collected data may include at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

In one embodiment, conditions are limits or thresholds on a performance level related to collected data. In one embodiment, a condition is an upper limit on jitter, or a lower limit on throughput. For example, if throughput drops below a lower limit/threshold, then DA 102 may report and send the data to server 105. In another example, if packet loss exceeds an upper limit, then DA 102 may report and send the data to the server. In one embodiment, a condition is time expiration on a scheduled collection. For example, DA 102 may send data to server 105 after a pre-defined time is expired.

In another embodiment, server 105 collects information from the DA's, through server initiated communication. In one embodiment, server 105 collects information by polling or scheduled based system. One such example of polling is ping. In one embodiment, server 105 may send a signal to a DA 102, or ping a DA 102, or communicate with a DA 102 on scheduled basis, after which DA 102 sends collected information to server 105.

In one embodiment, the computing device is one of: computer, personal computer, laptop/desktop, smart phone, tablet computing device; an access point (AP); a base station; a wireless smart phone device; a wireless LAN device; an access gateway; a router, a performance enhancement device; a DSL CPE modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless Wi-Fi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, server 105 is operable to store the WAN performance information in database 106 associated with server 105. In one embodiment, server 105 is operable to store the WAN performance information with an associated timestamp. In one embodiment, DA 102 is operable to collect LAN performance data from at least one of the computing device (e.g., 101*b*) and another device (e.g., PC 113) coupled to LAN 111. In one embodiment, server 105 is operable to receive the LAN performance data from DA 102.

In one embodiment, the WAN and LAN performance information include at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices.

Topological information may include information regarding the WAN or LAN topology. For example, whether a DSL modem is behind a firewall, or whether the Internet gateway is connected to a Wi-Fi access point via a router. The geographical information may include the address or global positioning system (GPS) location of the WAN or LAN modem, or the Internet gateway. The geographical information may be useful for example, for neighborhood analysis, and for correlating information regarding neighbors, or users in a given geographical location. Environment Statistics may include any statistics related to the environment surrounding the WAN or LAN. For example, usage statistics, statistics on periods of peak operation, statistics on the data traffic (peak traffic, average traffic, etc.).

In one embodiment, LAN performance information also includes, without limitation: LAN media type, such as Ethernet, Wi-Fi, or power-line adapters; LAN media throughput rates; channel assignments for Wi-Fi media; Wi-Fi mode such as 802.11g or 802.11n; Wi-Fi transmit power levels; and spectral masks for power-line communication.

In one embodiment, server 105 is operable to analyze the WAN performance information to generate an analysis result. In one embodiment, server 105 is operable to generate analysis result by computing throughput of DSL connection 110 by collecting current performance metrics associated with DSL service. In one embodiment, server 105 is operable to perform statistical analysis, including throughput, based on information received from the DA 102 and other information in the database.

In one embodiment, server 105 is operable to compute throughput of a communication link (e.g., Wi-Fi or Ethernet link 109) by probing. In one embodiment, the process of probing comprises: transmitting probing data from a communication device (e.g., PC 101*b*) to another communication device (e.g., PC 113, PC 114, etc.); and waiting for a predetermined time before reading operational data including counter values related to user data traffic. In one embodiment, the counter values include at least one of packet error counts, packet retransmission counts, successful ACK message counts, etc. The throughput information discussed in this embodiment and other embodiments of this disclosure could include at least one or more of the following: instantaneous speed or data rate, average data rate, and/or information on the peak and minimum data rates of a connection or communication link associated with the LAN and/or with the associated WAN.

The term "active probing" or simply "probing" generally refers to testing of a communication network by sending test pattern/data over the network from one communication device to another communication device, and then measuring the response from the sent test pattern. The response data is also referred herein as "active data" or "active measurement data" which is data associated with active probing of a communication network.

The term "operational data" generally refers to user visible or accessible data and is generally used for debugging and basic performance monitoring of communication systems.

In one embodiment, the method of probing comprises: transmitting probing data from a communication device (e.g., PC 101*b*) to another communication device (e.g., PC 113); and receiving a report indicating amount of data or data received by the other communication device.

In one embodiment, server 105 is operable to determine availability of higher bandwidth for operating a DSL service. In one embodiment, server 105 is operable to determine purchase information (or service product information) for improving DSL service performance. In one embodiment, server 105 is operable to determine network, service, or communication link utilization information for optimizing a consumer DSL service cost. In one embodiment, server 105 is operable to group data in database 106 according to at least one of geographical location, services type, service provider, or time. The service product information includes information regarding the type and specification of the DSL service or services which is a DSL service user/customer has purchased from the DSL service provider.

In one embodiment, server 105 receives information from other devices and/or sources other than the communication devices to perform a comprehensive analysis of the performance of the communication system as a whole and/or individually for the communication devices in the communication system. Examples of the other devices and/or sources include near-by radio stations, location of AM radio stations, goals or business rules defined by an operator, weather forecast from the National Weather Service, etc.

In one embodiment, server 105 is operable to report the analysis result by sending availability of higher bandwidth for operating a DSL service to DA 102 of 101a. In one embodiment, server 105 is operable to report the analysis result by sending purchase information (or service product information) to PC 101b, smart device 107, or the user for improving DSL service performance. In one embodiment, server 105 is operable to report the analysis result by sending utilization information to PC 101b, smart device 107, or any device accessible by the user for optimizing consumer DSL service cost. In one embodiment, DA 102 receives updated or new operational parameters from server 105 based on the analysis performed by server 105. For example, server 105 when analyzing the data collected by DA 102 of 101a, also takes into account historical information about the communication device 101a and information from other communication devices coupled to the network to provide updated operational parameters to DA 102 of 101a so that communication device 101a operates more efficiently under the current circumstances.

In one embodiment, server 105 is operable to report the analysis result to at least one of the broadband subscriber and the broadband subscriber's service provider. In one embodiment, server 105 is operable to report the analysis result by sending statistical analysis to the PC 101b, smart device 107, or any device accessible by the user, the statistical analysis including throughput. In one embodiment, server 105 is operable to report the analysis result by sending availability of higher bandwidth for operating a DSL service to DA 102 of 101a. In one embodiment, server 105 is operable to report the analysis result by sending purchase information (or service product information) to PC 101b, smart device 107, or the user for improving DSL service performance. In one embodiment, server 105 is operable to report the analysis result by sending utilization information to PC 101b, smart device 107, or any device accessible by the user for optimizing consumer DSL service cost.

In one embodiment, server 105 is operable to receive an on-demand change request. In one embodiment, the on-demand change is associated with at least one of: throughput, latency, packet loss, or jitter. For example, DA 102 of the PC 101b sends a request via connection 109 to server 105 to acquire higher throughput than current throughput for its DSL line 110. In such an embodiment, server 105 performs analysis based on available data in database 106 and determines if the on-demand request by PC 101b can be met. If it can be met, a report is provided to DA 102 by server 105 with information (e.g., cost etc.) about how to improve throughput.

In one embodiment, server 105 provides a marketplace of ideas for the communication devices for trading bandwidth (or performance) for media (or related) services. For example, server 105 may provide information to the communication devices (after performing its analysis from the collected and historical information of the communication system) such as subscription to premium media services, direct payment, etc. in exchange for improved performance.

In one embodiment, server 105 performs comprehensive analysis to recommend a service profile to a broadband subscriber and the broadband subscriber's service provider. In one embodiment, server 105 receives broadband data from an agent (e.g., 102 of 115). In one embodiment, the agent is executable on a computing device (e.g., 115) coupled to LAN 111 of a broadband subscriber.

In one embodiment, broadband data is user data and at least one of WAN performance information or LAN performance data. In one embodiment, a current service profile of the broadband subscriber is identified. In one embodiment, the received broadband data in view of a current service profile is analyzed by server 105. In one embodiment, a new service profile is determined by server 105 for the broadband subscriber according to the analyzed broadband data. In one embodiment, the new service profile is recommended to the broadband subscriber and the broadband subscriber's service provider.

In one embodiment, cloud 104, server 105, or broadband subscriber's service provider dynamically adjusts a service profile of the broadband subscriber with the new service profile. In one embodiment, the new service profile includes a turbo service with higher data rate or throughput than a previous server profile of the broadband subscriber. In one embodiment, the new service profile is accessed by one of: TV, personal computer, tablet computing device, mobile device, OTT services.

In one embodiment, comprehensive analysis allows cloud 104 or WAN-based server to compare collected user behavior and usage data with benchmark data. In one embodiment, cloud 104 or WAN-based server 105 provides user of the broadband service a targeted offer when the collected user behavior and usage data exceeds a threshold associated with the benchmark data. In one embodiment, benchmark data is determined by analyzing user behavior and usage data of other users in a common geographical area. In one embodiment, user behavior data includes one or more of online activities and mobile activities.

In one embodiment, online activities include data collected via the broadband service which is a DSL broadband service. In one embodiment, the targeted offer includes at least one of OTT services including one or more of movies, TV shows, games provided by a third party vendor; recommendations for improving performance of a broadband link associated with the broadband service; higher throughput for the broadband link associated with the broadband service, etc.

In one embodiment, cloud 104 or WAN-based server 105 provides user of the broadband service a reward in response to analyzing the collected data. In one embodiment, the reward includes at least one of: reward points to build credit towards future bill; reward credit for using the broadband service; reward miles towards an airline miles program, etc.

Figure 2:
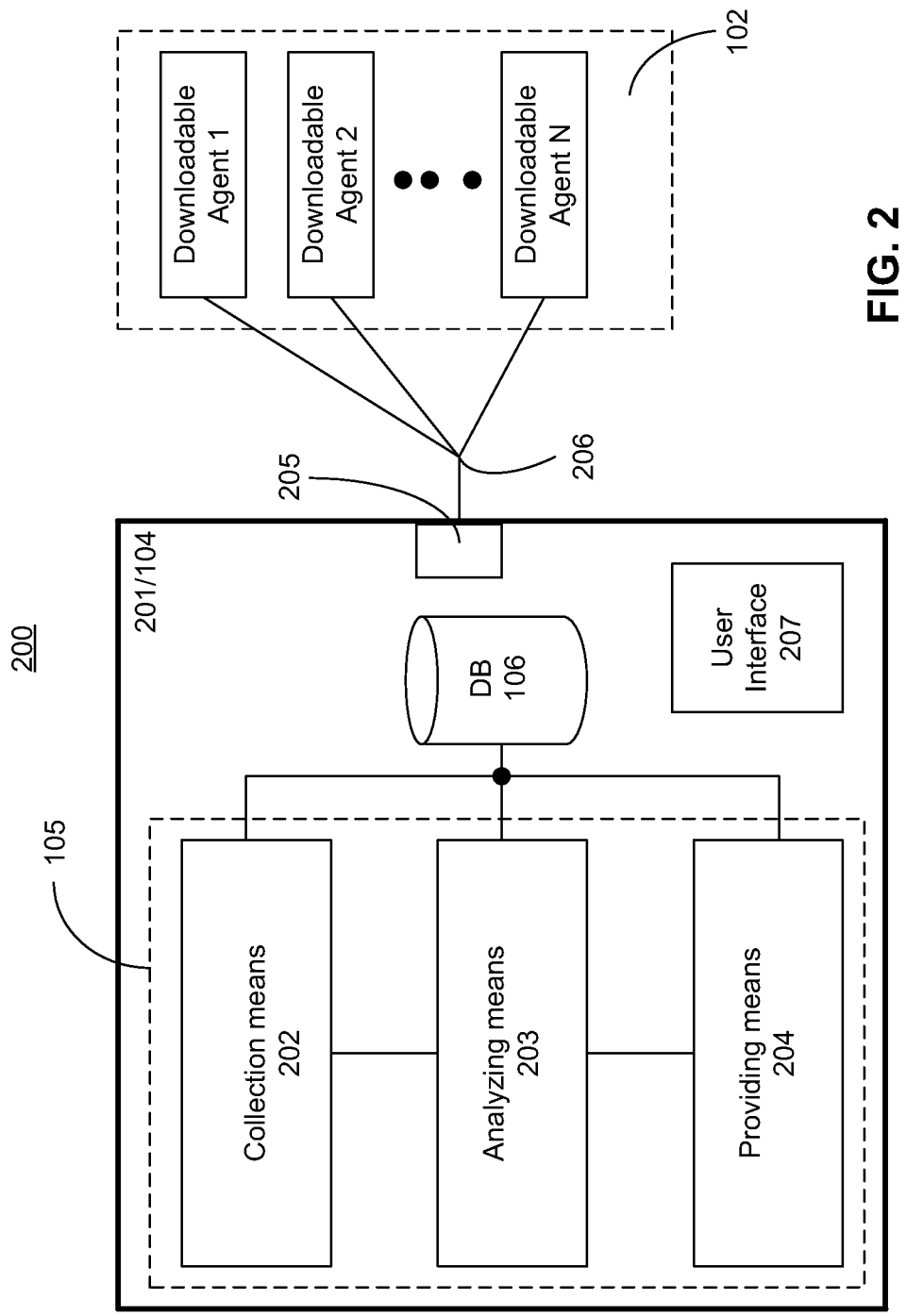
FIG. 2 illustrates a system with a server (or the analysis machine) operable to provide a targeted offer to a user of a broadband service, according to one embodiment of the disclosure.

FIG. 2 illustrates a system 200 with a server 105 (or the analysis machine) operable to provide targeted offer to user of a broadband service, according to one embodiment of the disclosure. It is pointed out that those elements of FIG. 2 having the same reference numbers (or names) as the elements of any other figure can operate or function in any manner similar to that described, but are not limited to such. FIG. 2 is described with reference to FIG. 1.

In one embodiment, the system 200 comprises a device 201 (e.g., cloud 104) having the server 105 coupled to the database 106. In one embodiment, server 105 comprises: a first module 202 (also called collecting means) for collecting the WAN and LAN performance and configuration information. In one embodiment, first module 202 collects user behavior and usage data associated with the broadband service. In one embodiment, first module 202 also collects physical layer data.

In one embodiment, user behavior data includes one or more of online activities and mobile activities. In one embodiment, online activities include data collected via the broadband service which is a DSL broadband service. Examples of online activities include shopping online, browsing the web, accessing video online, online gaming activities, accessing cloud-based applications, two-way video communications such as video conferencing, etc. In one embodiment, mobile activities include data associated with transfer of data via WiFi, 3G wireless network or 4G wireless network, or other mobile or wireless networks. Examples of mobile or wireless activities include mobile shopping, browsing the web, mobile online gaming, working with mobile applications, and mobile music, video, multimedia, two-way communications, and social networking.

In one embodiment, user behavior data includes timing patterns of data packets transmitted and received by the user over a broadband link associated with broadband service. Examples of user behavior data include any type of the data that relate to the user online or mobile activities, which for example include, timing information such as when the activity took place, or the length of time of the activity, type of data accessed (pictures, videos, applications), or any attribute related to the activities (for example type of games, type of videos), and prior user behavior date (e.g., historical data).

In one embodiment, prior user behavior data and user interests are used for determining choice of targeted offer for the user of the broadband service. For example, user visits an online photo sharing website (e.g., Shufferfly.com) using the broadband service. This visit information is stored and may be used to offer a faster upload connection to the user. In one embodiment, user behavior data may also include third party data such as user data obtained from a social network or from an Over-the-Top (OTT) service provider.

In one embodiment, user behavior data may also include location data (e.g., GPS data) or other identifying data (e.g. MAC (Media Access Control) address of the user device) of the user. In one embodiment, location data or user identification data is used for determining choice of targeted offer for the user of the broadband service. For example, a service provider may offer an improved service at a location different from the current location of the user. In this example, when the user moves to the new location where the service provider is offering the improved service, the providing means 204 (discussed later) may offer the user the improved service to improve user broadband usage experience.

In one embodiment, usage data includes amount of data packets transmitted and received by the user over a broadband link associated with the broadband service. In one embodiment, user usage data includes: location of the user, and location of the broadband service associated with the user. Examples of user usage data further includes data rates, throughput of data, layer 3 data, IP layer data, volume of data used, or type of data service used, or any usage data that relates to the user behavior.

In one embodiment, server 105 comprises a second module 203 (also called analyzing means) which analyzes the collected user behavior, usage data, and physical layer data to determine whether a different broadband service can be offered to a user compared to existing broadband service. In one embodiment, second module 203 analyzes the physical layer data in view of benchmark data. Benchmark data may include best data rates or average data rates achieved in a specific geographical area; data on downtimes of data services; data on loop length, data regarding physical layer characteristics of the line providing the broadband service, and/or any benchmark that is related to the data usage information.

In one embodiment, server 105 comprises a third module 204 (also called providing means) which provides the user of the broadband service a targeted offer according to the analysis performed by second module 203. In one embodiment, the targeted offer is a reward. In one embodiment, targeted offer is processed and managed by a third party. Examples of third party include the service providers or operators of the broadband services, or alternatively non-operators or any party which is not the service provider of the broadband service, however has been provided access to and is responsible for the management of the collected data. In one embodiment, third module 204 provides instructions to the third party or provider of the broadband service about how to manage the targeted offer. In one embodiment, the third party has access to billing system of the provider of the broadband service.

In one embodiment, the targeted offer includes at least one of: offer to fix broadband service if it is determined that the broadband service cannot be improved; OTT services including one or more of movies, TV shows, games provided by a third party vendor; recommendations for improving performance of a broadband link associated with the broadband service; higher throughput for the broadband link associated with the broadband service, higher upload or download speeds, permanent upgrade to a faster broadband service, OTT service for free for 'N' number of months, where 'N' is an integer; or minimum latency setting for playing games over the broadband service, etc.

In one embodiment, cloud 104 or WAN-based server 105 provides user of the broadband service a reward in response to analyzing the collected data. In one embodiment, the reward includes at least one of: reward points to build credit towards future bill; reward credit for using the broadband service; reward miles towards an airline miles program, etc.

In one embodiment, broadband services are one of: DSL service, WiFi, $3^{rd}$ generation of mobile telecommunications technology (3G), $4^{th}$ generation of mobile telecommunication technology (4G), Long Term Evolution (LTE); or wires or wireless service.

In one embodiment, server 105 comprises: a management interface 205 for communicating with the DA 102 (any one of DAs 1-N, where 'N' is a positive integer) via the Internet 206 (e.g., 111, 109 of FIG. 1). In one embodiment, server 105 comprises: a user interface module 207 for providing access to other communication devices and for displaying information associated with the first 202, second 203 and third 204 modules.

In one embodiment, analyzing (by analyzing means 203) the collected user behavior, usage data, and physical layer data includes: determining available services offered by the broadband service; and assessing the collected user behavior, usage data, and physical layer data to identity parameters to improve performance of the broadband service in view of applications used by the user of the broadband service and determined available services. In one embodiment, the parameters identified to improve performance of the broadband service include at least one of: rate; margin; power; or latency. In one embodiment, the analyzing means 203 (or any other appropriate logic) adjusts the identified parameters to improve performance of the broadband service.

In one embodiment, if the analyzing of collected user behavior, usage data, and physical layer data by the analyzing means determines that a different broadband service cannot be offered to the user, then the server 201/104 sends diagnostics recommendations to the user. In one embodiment, the diagnostics recommendations include high level recommendations to the user. For example, the user may be asked to call a customer service representative for getting assistance for improving the broadband service.

Figure 3:
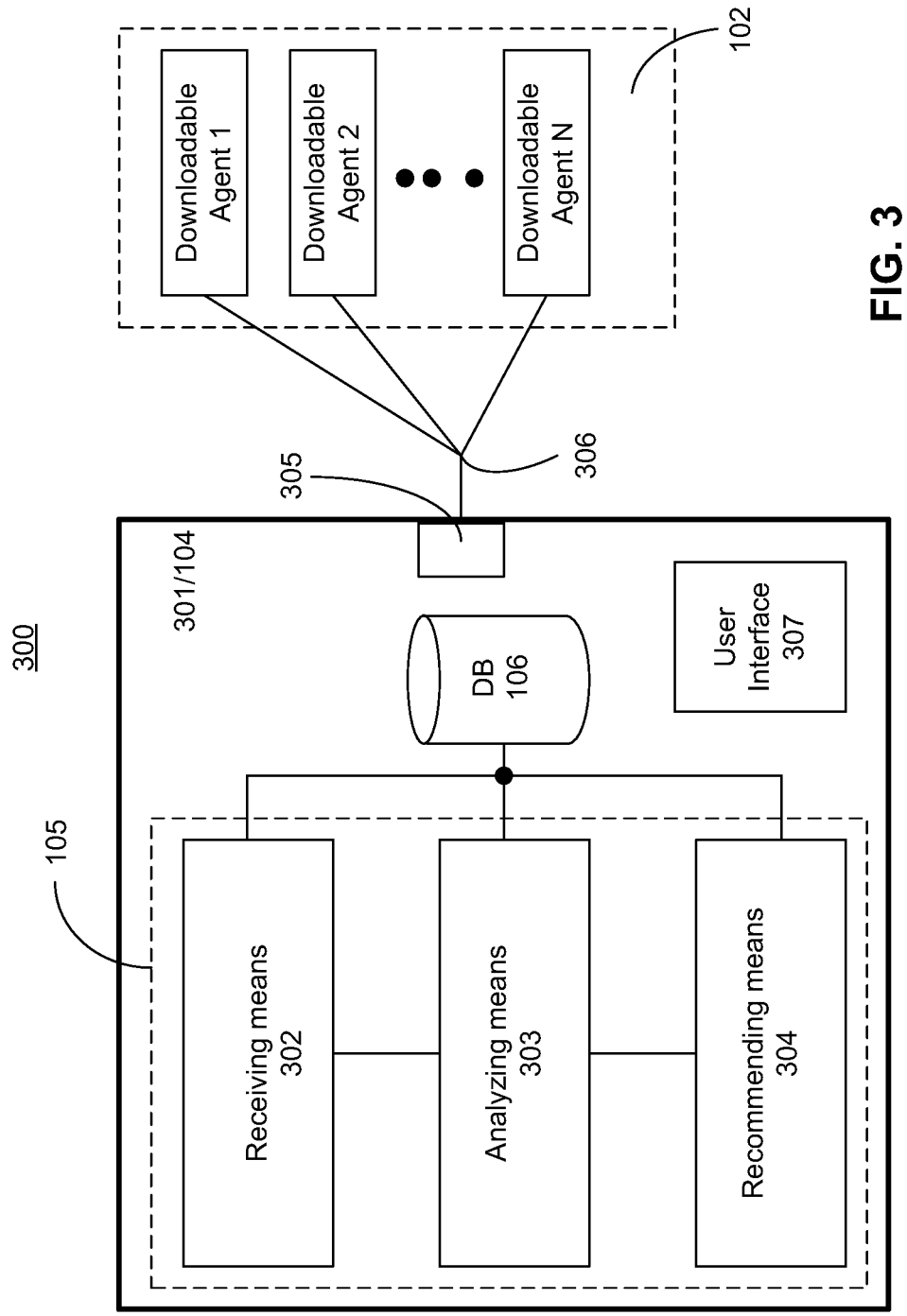
FIG. 3 illustrates a system with a server (or the analysis machine) operable to recommend new profiles to broadband service providers and/or subscribers, according to one embodiment of the disclosure.

FIG. 3 illustrates a system 300 with a server (or the analysis machine) operable to recommend new profiles to broadband service providers and/or subscribers, according to one embodiment of the disclosure. It is pointed out that those elements of FIG. 3 having the same reference numbers (or names) as the elements of any other figure can operate or function in any manner similar to that described, but are not limited to such.

In one embodiment, system 300 comprises a device 301 (e.g., cloud 104) having the server (e.g., 105) coupled to the database (e.g., 106). In one embodiment, server 105 comprises: a first module 302 (also called receiving means) for receiving broadband data from an agent (e.g., agent 102). In one embodiment, the agent is executable on a computing device coupled to a LAN of a broadband subscriber. In one embodiment, broadband data is user usage data and at least one of WAN performance information or LAN performance data. In one embodiment, agent 102 (i.e., downloadable agent) includes an Application Programming Interface (API).

In one embodiment, server 105 comprises a second module 303 (also called analyzing means) which identifies a current service profile of the broadband subscriber. In one embodiment, second module 303 analyzes the received broadband data in view of the current service profile. In one embodiment, second module 303 determines a new service profile for the broadband subscriber according to the analyzed broadband data.

In one embodiment, second module 303 computes throughput of DSL connection by collecting current performance metrics associated with DSL service. In one embodiment, throughput is computed with reference to a website. In one embodiment, throughput computation comprises probing a network. In one embodiment, the new service profile includes a turbo service with higher data rate or throughput than a pervious services profile of the broadband subscriber.

In one embodiment, server 105 comprises a third module 304 (also called recommending means) which recommends the new service profile to the broadband subscriber and the broadband subscriber's service provider. In one embodiment, the new service profile is accessed by one of: television (TV), personal computer (PC), tablet computing device, Mobile device, and OTT services. In one embodiment, server 105 is operable to receive WAN performance information from agent, wherein the LAN is coupled by another device to the LAN.

In one embodiment, server 105 comprises: a management interface 305 for communicating with the DA 102 (any one of DAs 1-N, where 'N' is a positive integer) via the Internet 306 (e.g., 111, 109 of FIG. 1). In one embodiment, server 105 comprises: a user interface module 307 for providing access to other communication devices and for displaying information associated with the first 302, second 303 and third 304 modules.

Figure 4:
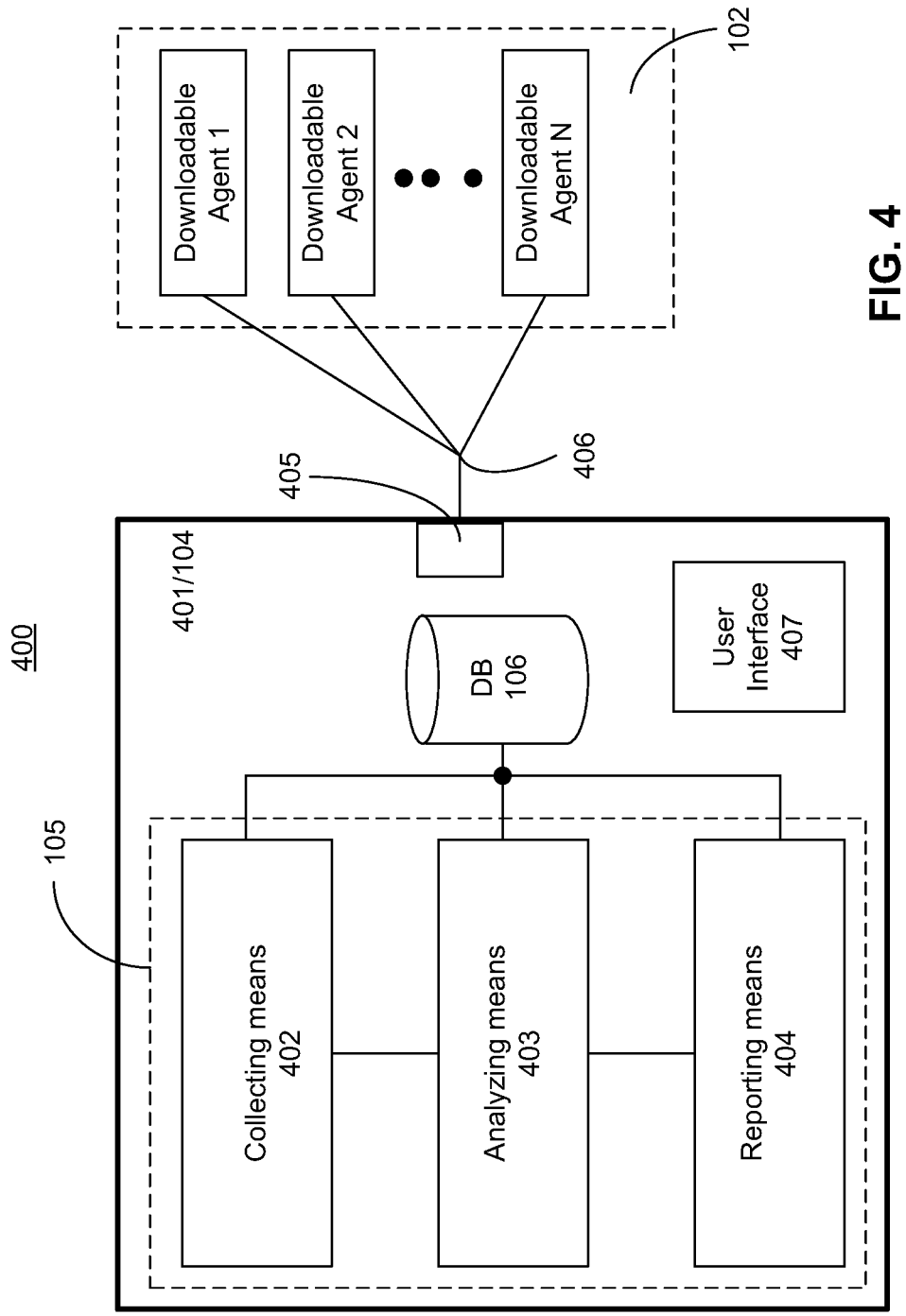
FIG. 4 illustrates a system with a server (or the analysis machine) operable to report a new profile to the broadband subscriber and broadband subscriber's service provider, according to one embodiment of the disclosure.

FIG. 4 illustrates a system 400 with a server (or the analysis machine) operable to report a new profile to the broadband subscriber and broadband subscriber's service provider, according to one embodiment of the disclosure. It is pointed out that those elements of FIG. 4 having the same reference numbers (or names) as the elements of any other figure can operate or function in any manner similar to that described, but are not limited to such.

In one embodiment, the server 105 comprises: a first module 402 (also called collecting means) for collecting and/or storing the WAN and LAN performance and configuration information in the database 106 associated with server 105. In one embodiment, first module 402 may receive on-demand change request associated with at least one of: throughput, or latency.

In one embodiment, server 105 comprises a second module 403 (also called analyzing means) for analyzing the WAN performance information. In one embodiment, WAN performance information includes at least one of: topological information, geographical information, time, throughput, latency, jitter, packet loss, type of communication device, device network identification, manufacturer and model of equipment, equipment characteristics, firmware, user's network usage pattern, RF characteristics including at least one of: signal power, frequency bands and mode of operation, environment statistics, or data on operation of communication devices. In one embodiment, a new service profile for the broadband subscriber is determined according to the received and analyzed WAN performance information.

In one embodiment, second module 403 analyzes received user preference data and WAN performance information to determine an operational profile for the broadband subscriber in response to the analysis.

In one embodiment, server 105 comprises a third module 404 (also called reporting means) for reporting the new service profile to the broadband subscriber and the broadband subscriber's service provider. In one embodiment, reporting the analysis result comprises at least one of: sending statistical analysis including throughput; sending availability of higher bandwidth for operating a DSL service; sending purchase information for improving DSL service performance; or sending utilization information for optimizing a consumers' DSL service cost. In one embodiment, third module 404 sends the operational profile to the agent of the broadband subscriber and the broadband subscriber's service provider.

In one embodiment, modules (e.g., DA 102) that receive the instruction and command from third module 404 are accessible by the Internet. In one embodiment, server 105 comprises: a management interface 405 for communicating with the DA 102 (any one of DAs 1-N, where 'N' is a positive integer) via the Internet 406 (e.g., 111, 109 of FIG. 1). In one embodiment, server 105 comprises: a user interface module 407 for providing access to other communication devices and for displaying information associated with first 402, second 403 and third 404 modules.

Figure 5:
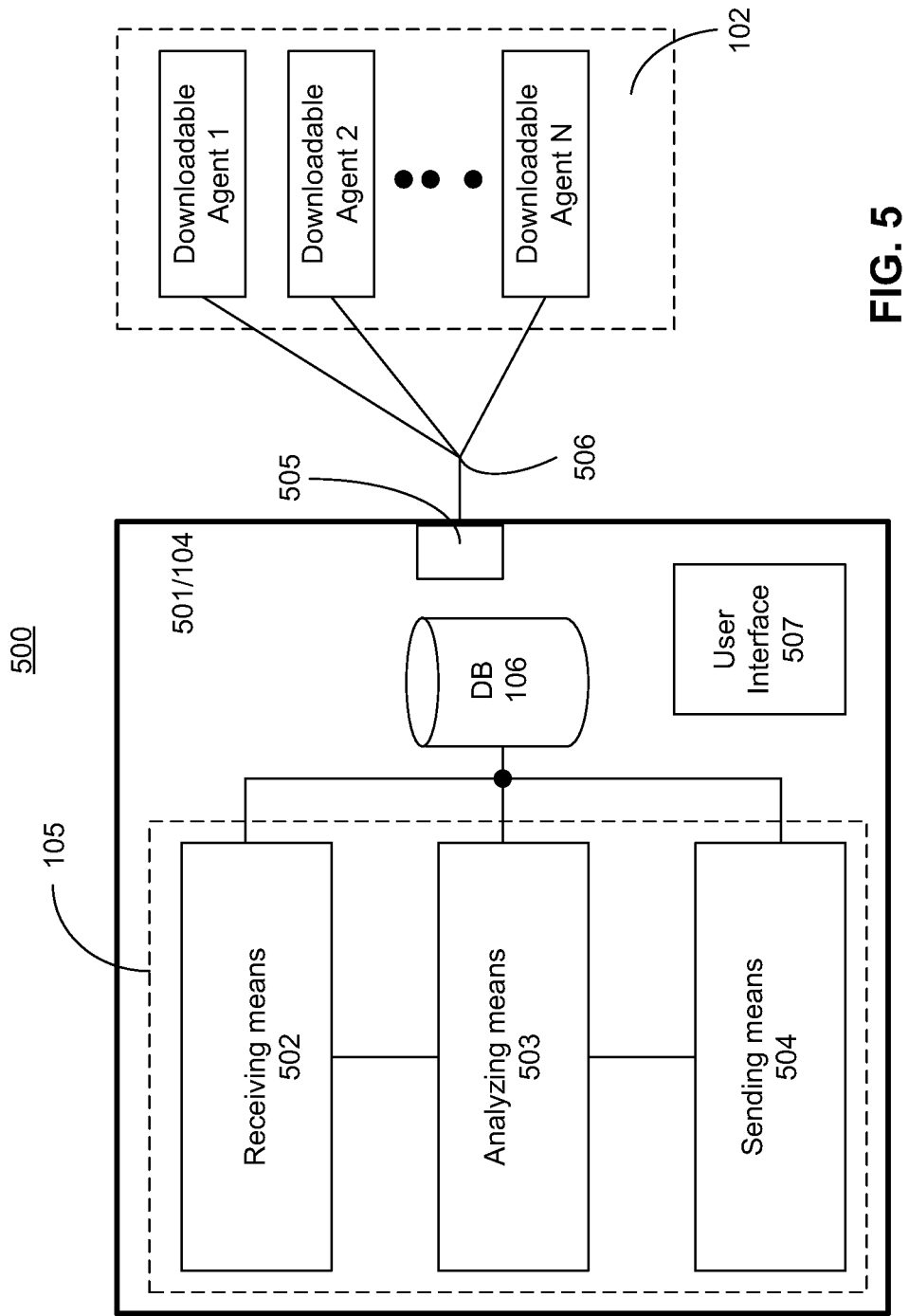
FIG. 5 illustrates a system with a server (or the analysis machine) operable to generate and provide instructions and commands according to statistical analysis for at least one of the broadband subscriber and broadband subscriber's service provider, according to one embodiment of the disclosure.

FIG. 5 illustrates a system 500 with a server (or the analysis machine) which is operable to generate instructions and commands according to statistical analysis for at least one of the broadband subscriber and broadband subscriber's service provider, according to one embodiment of the disclosure. It is pointed out that those elements of FIG. 5 having the same reference numbers (or names) as the elements of any other figure can operate or function in any manner similar to that described, but are not limited to such.

In one embodiment, server 105 comprises: a first module 502 (also called receiving means) for collecting and/or storing the WAN and LAN performance and configuration information in database 106 associated with server 105. In one embodiment, server 105 comprises a second module 503 (also called analyzing means) for performing statistical analysis using the WAN and LAN performance and configuration information. In one embodiment, server 105 comprises a third module 504 (also called sending means) for generating instruction and commands according to the statistical analysis and sending them to at least one of the broadband subscriber, networking equipment at the broadband subscriber's premises, the service provider of the broadband subscriber and the access equipment of the service provider.

In one embodiment, modules (e.g., DA 102) that receive the instruction and command from the third module 504 are accessible by the Internet. In one embodiment, server 105 comprises: a management interface 505 for communicating with DA 102 (any one of DAs 1-N, where 'N' is a positive integer) via the Internet 506 (e.g., 111, 109 of FIG. 1). In one embodiment, server 105 comprises: a user interface module 507 for providing access to other communication devices and for displaying information associated with first 502, second 503 and third 504 modules.

Figure 6:
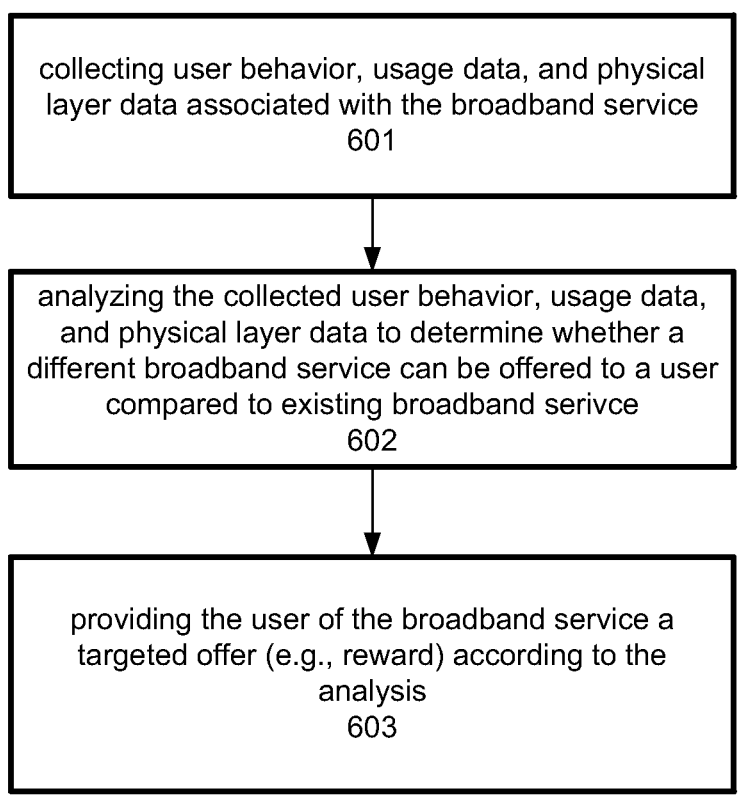
FIG. 6 illustrates a flowchart of a method performed by a server to provide targeted offers to users of a broadband service, according to another embodiment of the disclosure.

FIG. 6 illustrates a flowchart 600 of a method performed by a server (e.g., 105) to provide targeted offers to users of a broadband service, according to another embodiment of the disclosure.

Although the blocks in the flowcharts with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 601, collecting means 202 collects user behavior, usage data, and physical layer data associated with the broadband service. At block 602, analyzing means 203 analyzes the collected user behavior, usage data, and physical layer data to determine whether a different broadband service can be offered to a user compared to existing broadband service. In one embodiment, analysis means 203 determines existing available broadband services provided by the broadband service provider to a location where the user is currently residing. The analysis means 203 then compares the existing available broadband services against usage data, user behavior data, and/or physical data collected by collecting means 202.

In one embodiment, analysis means 203 prepares a service change recommendation for the user of the broadband service in view of the analysis. For example, the service change recommendation may indicate whether an improved service (i.e., faster and more reliable broadband service) is available to the user in the current location of the user. At block 603, providing means provide the user of the broadband service a targeted offer according to the analysis. In one embodiment, the targeted offer may also include an offer to the user to help to fix the physical line providing the broadband service to the user. For example, because the service change recommendation included no new recommendations, the bottleneck for improved services may reside in the physical line providing the broadband service. Improving the physical line may unlock faster broadband service which is currently not possible with the user's current physical line providing the broadband service.

Figure 7:
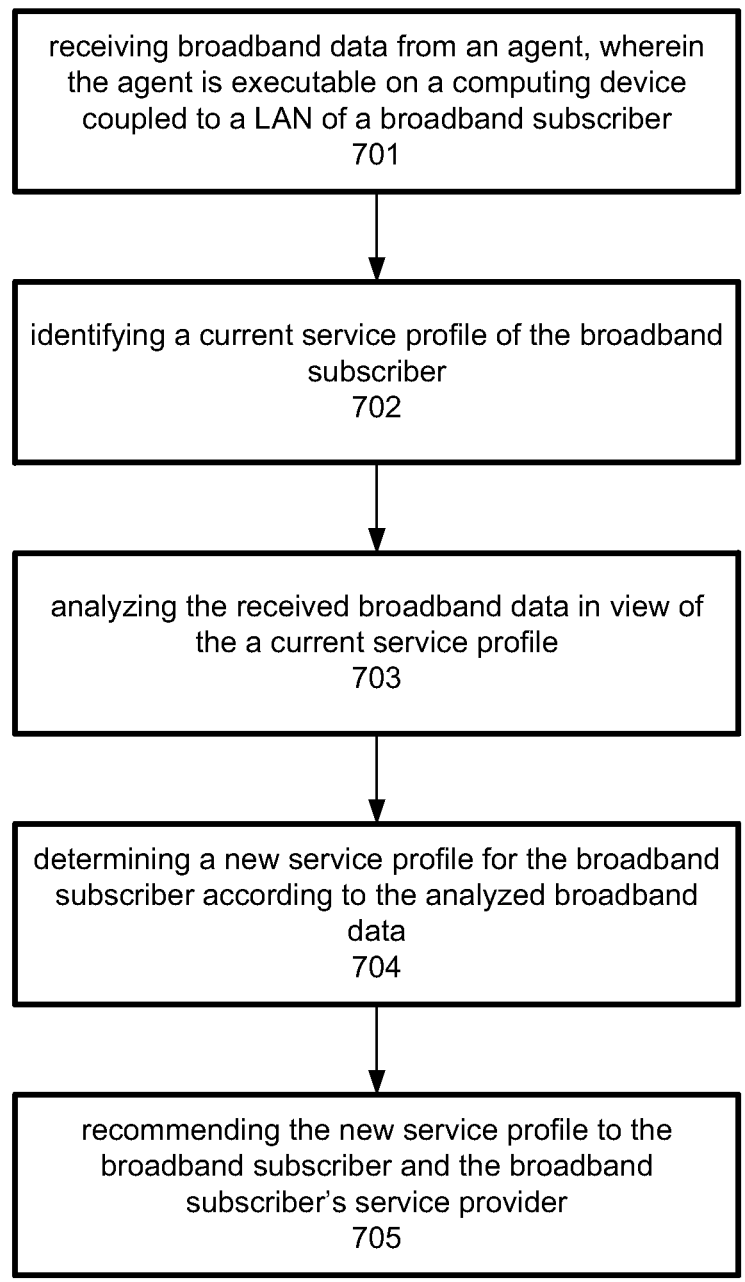
FIG. 7 illustrates a flowchart of a method performed by a server to recommend new service profiles to a broadband subscriber and/or broadband service provider, according to one embodiment of the disclosure.

FIG. 7 illustrates a flowchart 700 of a method performed by a server to recommend new service profiles to a broadband subscriber and/or broadband service provider, according to one embodiment of the disclosure.

Although the blocks in the flowcharts with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 701, receiving means 302 of server 105 receives broadband data from an agent (e.g., DA 102). In one embodiment, agent 102 is executable on a computing device coupled to a LAN of a broadband subscriber. At block 702, analyzing means 303 of server 105 identifies a current service profile of the broadband subscriber. At block 703, analyzing means 303 of server 105 analyzes the received broadband data in view of the current service profile. At block 704, analyzing means 303 of server 105 determines a new service profile for the broadband subscriber according to the analyzed broadband data.

In one embodiment, analysis means 303 prepares a service change recommendation for the user of the broadband service in view of the analysis. For example, the service change recommendation may indicate whether an improved service (i.e., faster and more reliable broadband service) is available to the user in the current location of the user. In one embodiment, the service change recommendation may also include an offer to the user to help to fix the physical line providing the broadband service to the user. For example, analysis means 303 determines that the bottleneck for improving services may reside in the physical line providing the broadband service, and that improving the physical line may unlock faster broadband service which is currently not possible with the user's current physical line providing the broadband service. At block 705, recommending means 304 of server 105 recommends the new service profile to the broadband subscriber and the broadband subscriber's service provider.

In one embodiment, the method further comprises dynamically adjusting a service profile of the broadband subscriber with the new service profile. In one embodiment, the method further comprises receiving by collecting means 402 WAN performance information from the agent, where the LAN is coupled by another device to the LAN. In one embodiment, the method further comprises storing the WAN performance information in the database 106 associated with the server 105. In one embodiment, the method further comprises analyzing by the analyzing means 403 the WAN performance information. In one embodiment, the method further comprises determining by the analyzing means 403 a new service profile for the broadband subscriber according to the received and analyzed WAN performance information.

In one embodiment, the method further comprises reporting by the reporting means 404 the new service profile to the broadband subscriber and the broadband subscriber's service provider. In one embodiment, reporting the analysis result comprises at least one of: sending statistical analysis including throughput; sending availability of higher bandwidth for operating a DSL service; sending purchase information for improving DSL service performance; or sending utilization information for optimizing a consumer's DSL service cost.

In one embodiment, the method further comprises receiving means 502 for collecting WAN performance information. In one embodiment, the method further comprises performing statistical analysis by the analysis means 503 using a first WAN performance information. In one embodiment, the method further comprises generating instructions and commands according to the statistical analysis and sending them by sending means 504 to at least one of the broadband subscriber, networking equipment at the broadband subscriber's premises, the service provider of the broadband subscriber and the access equipment of the service provider. In one embodiment, the method further comprises computing throughput of DSL connection by collecting current performance metrics associated with DSL service.

Figure 8:
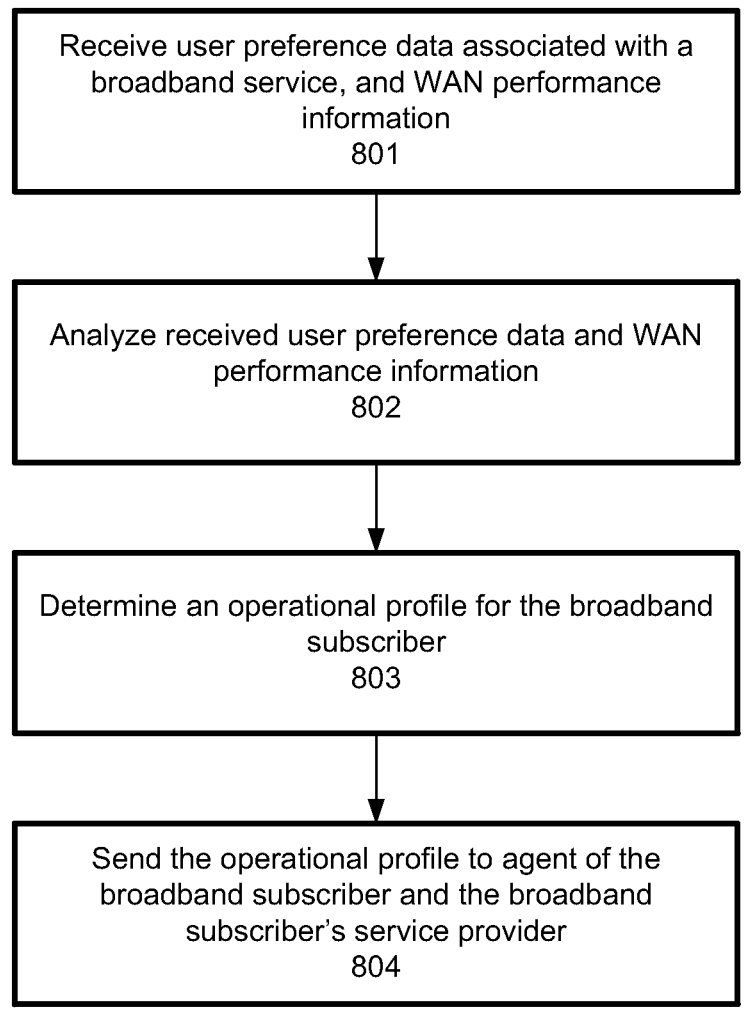
FIG. 8 illustrates a flowchart of a method performed by a server to determine and send operational profile to an agent of a broadband subscriber and the broadband subscriber's service provider, according to one embodiment of the disclosure.

FIG. 8 illustrates a flowchart 800 of a method performed by a server to determine and send optional profile to an agent of a broadband subscriber and the broadband subscriber's service provider, according to one embodiment of the disclosure.

Although the blocks in the flowcharts with reference to FIG. 8 are shown in a particular order, the order of the actions can be modified. Thus, the illustrated embodiments can be performed in a different order, and some actions/blocks may be performed in parallel. Some of the blocks and/or operations listed in FIG. 8 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 801, receiver means 502 of server 105 receives user preference data, associate with a broadband service, from an agent (e.g., DA 102). In one embodiment, the agent is executable on a computing device coupled to LAN of a broadband subscriber. In one embodiment, receiver means 502 of server 105 receives WAN performance information, where LAN is coupled by another device to a WAN.

At block 802, analyzing means 503 of server 105 analyzes received user preference data and WAN performance information. In one embodiment, at block 803, analyzing means 503 of server 105 determines an operational profile for the broadband subscriber in response to the analysis. At block 804, sending means 504 of server 105 sends the operational profile to the agent of the broadband subscriber and the broadband subscriber's service provider.

Figure 9:
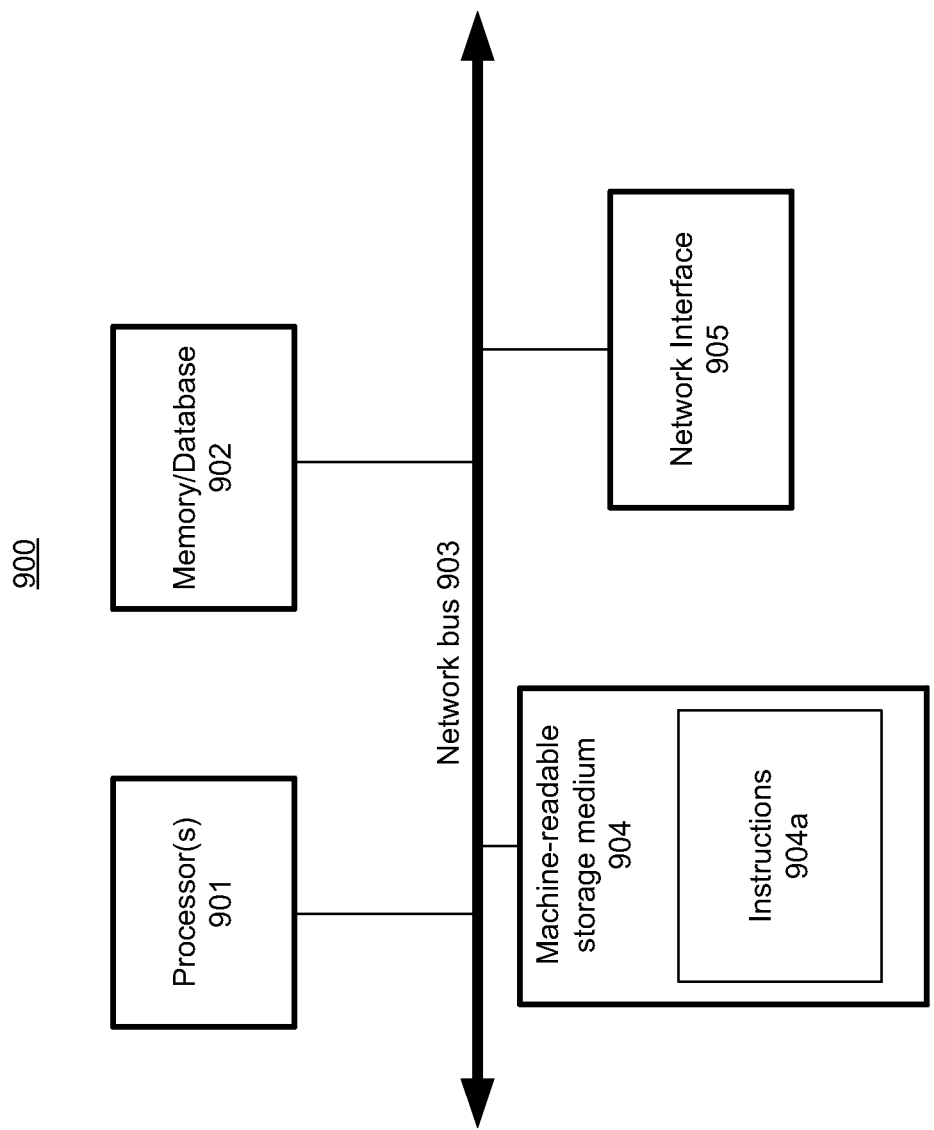
FIG. 9 illustrates a processor-based system having machine-readable storage medium with computer executable instructions to perform the processes and methods, according to one embodiment of the disclosure.

FIG. 9 illustrates a processor-based system 900 having machine-readable storage medium with computer executable instructions to perform the processes and methods, according to one embodiment of the disclosure. In one embodiment, processor-based system 900 comprises a processor(s) 901, memory/database 902, network bus 903, machine-readable storage medium 904, and network interface 905.

In one embodiment, machine-readable storage medium 904 and associated computer executable instructions 904a may be in any of the communication devices and/or servers discussed herein. The computer-machine-readable/executable instructions 904a are executed by processor 901. Elements of embodiments are provided as machine-readable medium for storing the computer-executable instructions (e.g., instructions to implement the flowcharts and other processes discussed in the description).

In one embodiment, database 902 is operable to store data used by the instructions 904a (also called software code/instructions). In one embodiment, network interface 905 is operable to communicate with other devices. In one embodiment, the components of processor-based system 900 communicate with one another via network bus 903.

The machine-readable storage medium 904 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Program software code/instructions 904a executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software." The program software code/instructions 904a typically include one or more instructions stored at various times in various tangible memory and storage devices in or peripheral to the computing device, that, when fetched/read and executed by the computing device, as defined herein, cause the computing device to perform functions, functionalities and operations necessary to perform a method, so as to execute elements involving various aspects of the function, functionalities, and operations of the method(s) forming an aspect of the disclosed subject matter.

For the purposes of this disclosure a module is a software, hardware, or firmware (or combinations thereof) system, process or functionality, or component thereof, that performs or facilitates the processes, features, and/or functions, functionalities and/or operations described herein (with or without human interaction or augmentation) as being performed by the identified module. A module can include sub-modules. Software components of a module may be stored on a tangible machine readable medium (e.g., 904). Modules may be integral to one or more servers, or be loaded and executed by one or more servers. One or more modules may be grouped into an engine or an application.

A tangible machine readable medium (e.g., 904) can be used to store program software code/instructions (e.g., 904a) and data that, when executed by a computing device 900, cause the computing device 900 to perform a method(s) as may be recited in one or more accompanying claims directed to the disclosed subject matter. The tangible machine readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in a same communication session.

The software program code/instructions and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Blackberry® Droid®, or the like, or any other device including a computing device. In one embodiment, processor-based system 900 is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, in one embodiment, a method for controlling a broadband service is provided. In one embodiment, the method comprises: collecting user behavior, usage data, and physical layer data associated with the broadband service; analyzing the collected user behavior, usage data, and physical layer data to determine whether a different broadband service can be offered to a user compared to existing broadband service; providing, the user of the broadband service, a targeted offer according to the analysis.

In one embodiment, analyzing the collected user behavior, usage data, and physical layer data includes: determining available services offered by the broadband service; and assessing the collected user behavior, usage data, and physical layer data to identity parameters to improve performance of the broadband service in view of applications used by the user of the broadband service and determined available services.

In one embodiment, the parameters identified to improve performance of the broadband service include at least one of: rate; margin; power; or latency. In one embodiment, the method further comprises adjusting identified parameters to improve performance of the broadband service. In one embodiment, if the analyzing of collected user behavior, usage data, and physical layer data determines that a different broadband service cannot be offered to the user, then the method comprises: sending diagnostics recommendations to the user. In one embodiment, the diagnostics recommendations include high level recommendations to the user.

In one embodiment, the broadband service is a Digital Subscriber Line (DSL) broadband service. In one embodiment, analyzing the collected user behavior, usage data, and physical layer data comprises analyzing user behavior and usage data of other users in a common geographical area. In one embodiment, the user behavior data includes one or more of online activities; and mobile or wireless activities. In one embodiment, the online activities include at least one of: data collected via the broadband service which is a Digital Subscriber Line (DSL) broadband service; data collected when the user is shopping online using the broadband service; data collected when the user is browsing the Internet using the broadband service; data collected when the user is accessing video online using the broadband service; data collected when the user is participating in online gaming activities using the broadband service; data collected when the user is accessing cloud-based applications using the broadband service; and data collected when the user is participating in a two-way communication using the broadband service.

In one embodiment, the mobile activities include data associated with transfer of data via WiFi, 3G wireless network or 4G wireless network. In one embodiment, the user behavior data includes timing patterns of data packets transmitted and received by the user over a broadband link associated with the broadband service. In one embodiment, the usage data includes amount of data packets transmitted and received by the user over a broadband link associated with the broadband service. In one embodiment, the usage data includes: location of the user; location of the broadband service associated with the user; and Layer 3 data.

In one embodiment, the targeted offer includes a reward. In one embodiment, the targeted offer includes at least one of: offer to fix broadband service if it is determined that the broadband service cannot be improved; Over The Top (OTT) services including one or more of movies, TV shows, games provided by a third party vendor; recommendations for improving performance of a broadband link associated with the broadband service; higher throughput for the broadband link associated with the broadband service; higher upload or download speeds, permanent upgrade to a faster broadband service, OTT service for free for 'N' number of months, where 'N' is an integer; or minimum latency setting for playing games over the broadband service.

In one embodiment, the reward includes at least one of: reward points to build credit towards future bill; reward credit for using the broadband service; or reward miles towards an airline miles program. In one embodiment, the targeted offer is processed and managed by a third party.

In one embodiment, the method further comprises providing instructions to the third party or provider of the broadband service about how to manage the targeted offer. In one embodiment, the third party has access to billing system of the provider of the broadband service. In one embodiment, the broadband services is one of: Digital Subscriber Line (DSL) service; WiFi; 3rd generation of mobile telecommunications technology (3G); 4th generation of mobile telecommunications technology (4G); Long Term Evolution; or Wired or wireless service.

In another example, a machine executable storage medium having machine executable instructions is provided, that when executed causes a machine to perform the method discussed in the disclosure.

In another example, an apparatus for controlling a broadband service is provided. In one embodiment, the apparatus comprises: a database; and a server, coupled to the hardware database, the server operable to: collect user behavior, usage data, and physical layer data associated with the broadband service; analyze the collected user behavior, usage data, and physical layer data to determine whether a different broadband service can be offered to a user compared to existing broadband service; provide the user of the broadband service a targeted offer according to the analysis.

In one embodiment, the server is operable to analyze the collected user behavior, usage data, and physical layer data by: determining available services offered by the broadband service; and assessing the collected user behavior, usage data, and physical layer data to identity parameters to improve performance of the broadband service in view of applications used by the user of the broadband service and determined available services.

In one embodiment, the parameters identified to improve performance of the broadband service include at least one of: rate; margin; power; or latency.

In one embodiment, the apparatus further comprises adjusting identified parameters to improve performance of the broadband service. In one embodiment, if the analyzing of collected user behavior, usage data, and physical layer data determines that a different broadband service cannot be offered to the user, then the server is operable to send diagnostics recommendations to the user.

In one embodiment, the diagnostics recommendations include high level recommendations to the user. In one embodiment, the broadband service is a Digital Subscriber Line (DSL) broadband service. In one embodiment, the server is operable to analyze the collected user behavior, usage data, and physical layer data by analyzing user behavior and usage data of other users in a common geographical area. In one embodiment, the user behavior data includes one or more of: online activities; and mobile activities.

In one embodiment, the online activities include at least one of: data collected via the broadband service which is a Digital Subscriber Line (DSL) broadband service; data collected when the user is shopping online using the broadband service; data collected when the user is browsing the Internet using the broadband service; data collected when the user is accessing video online using the broadband service; data collected when the user is participating in online gaming activities using the broadband service; data collected when the user is accessing cloud-based applications using the broadband service; and data collected when the user is participating in a two-way communication using the broadband service.

In one embodiment, the mobile activities include data associated with transfer of data via WiFi, 3G wireless network or 4G wireless network. In one embodiment, the user behavior data includes timing patterns of data packets transmitted and received by the user over a broadband link associated with the broadband service. In one embodiment, the usage data includes amount of data packets transmitted and received by the user over a broadband link associated with the broadband service. In one embodiment, the usage data includes: location of the user, and location of the broadband service associated with the user.

In one embodiment, the targeted offer includes a reward. In one embodiment, the targeted offer includes at least one of: offer to fix broadband service if it is determined that the broadband service cannot be improved; Over The Top (OTT) services including one or more of movies, TV shows, games provided by a third party vendor; recommendations for improving performance of a broadband link associated with the broadband service; or higher throughput for the broadband link associated with the broadband service.

In one embodiment, the reward includes at least one of: reward points to build credit towards future bill; reward credit for using the broadband service; or reward miles towards an airline miles program. In one embodiment, the targeted offer is processed and managed by a third party. In one embodiment, the server is operable to provide instructions to the third party or provider of the broadband service about how to manage the targeted offer. In one embodiment, the third party has access to billing system of the provider of the broadband service.

In one embodiment, the broadband services is one of: Digital Subscriber Line (DSL) service; WiFi; 3rd generation of mobile telecommunications technology (3G); 4th generation of mobile telecommunications technology (4G); Long Term Evolution (LTE); or Wired or wireless service.

In another example, an apparatus for recommending a service profile is provided. In one embodiment, the apparatus comprises: a hardware database; and a server coupled to the hardware database, the server operable to: receive broadband data from an agent, wherein the agent is executable on a computing device coupled to a LAN of a broadband subscriber; identify a current service profile of the broadband subscriber; analyze the received broadband data in view of the a current service profile; determine a new service profile for the broadband subscriber according to the analyzed broadband data; and recommend the new service profile to the broadband subscriber and the broadband subscriber's service provider.

In one embodiment, the broadband data is user usage data and at least one of WAN performance information or LAN performance data. In one embodiment, the agent includes an Application Programming Interface (API). In one embodiment, the agent is a downloadable agent. In one embodiment, the server is operable to: dynamically adjust a service profile of the broadband subscriber with the new service profile. In one embodiment, the new service profile includes a turbo service with higher data rate or throughput than a previous service profile of the broadband subscriber.

In one embodiment, the new service profile is accessed by one of: Television (TV); Personal computer (PC); Tablet computing device; Mobile device; and Over The Top (OTT) services including one or more of movies, TV shows, games provided by a third party vendor. In one embodiment, the server is operable to receive WAN performance information from the agent, wherein the LAN is coupled by another device to a WAN.

In one embodiment, the server is operable to: store the WAN performance information in the database associated with the server; analyze the WAN performance information; determine a new service profile for the broadband subscriber according to the received and analyzed WAN performance information; and report the new service profile to the broadband subscriber and the broadband subscriber's service provider.

In one embodiment, the server comprises: a first module for collecting the WAN performance information; a second module for performing statistical analysis using a first WAN performance information; and a third module for generating instruction and commands according to the statistical analysis for at least one of the broadband subscriber, networking equipment at the broadband subscriber's premises, the service provider of the broadband subscriber and the access equipment of the service provider.

In one embodiment, the modules that receive the instruction and command from the third module are accessible by the internet. In one embodiment, the server comprises: a management interface for communicating with the agent via internet. In one embodiment, the server comprises: a user interface module for providing access and for displaying information associated with the first, second, third modules. In one embodiment, the server is operable to compute throughput of DSL connection by collecting current performance metrics associated with DSL service. In one embodiment, the server to perform throughput computation with reference to a website. In one embodiment, the throughput computation comprises probing a network. In one embodiment, the agent is executable in a virtual machine on the computing device. In one embodiment, the agent is dynamically downloaded to the computing device.

In one embodiment, the server is operable to report a result from analysis by performing at least one of: sending statistical analysis including throughput; sending availability of higher bandwidth for operating a DSL service; sending purchase information for improving DSL service performance; or sending utilization information for optimizing a consumers DSL service cost.

In one embodiment, the WAN performance information includes at least one of: topological information; geographical information; time; throughput; latency; jitter; packet loss; type of communication device; device network identification; manufacturer and model of equipment; equipment characteristics; firmware; user's network usage pattern; RF characteristics including at least one of: signal power, frequency bands and mode of operation; environment statistics; or data on operation of communication devices.

In one embodiment, the server is operable to: receive an on-demand change request associated with at least one of: throughput, or latency. In one embodiment, the computing device is one of: an access point (AP); a base station; a wireless smartphone device; a wireless LAN device; an access gateway; a router; a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the server resides in a cloud. In one embodiment, the server is operable to store the WAN performance information with an associated timestamp. In one embodiment, the agent is operable to collect LAN performance data from at least one of the computing device or another device coupled to the LAN.

In another example, a method for recommending a service profile is provided. In one embodiment, the method comprises: receiving broadband data from an agent, wherein the agent is executable on a computing device coupled to a LAN of a broadband subscriber; identifying a current service profile of the broadband subscriber; analyzing the received broadband data in view of the current service profile; determining a new service profile for the broadband subscriber according to the analyzed broadband data; and recommending the new service profile to the broadband subscriber and the broadband subscriber's service provider.

In one embodiment, the broadband data is user usage data and at least one of WAN performance information or LAN performance data. In one embodiment, the method further comprises: dynamically adjusting a service profile of the broadband subscriber with the new service profile. In one embodiment, the agent includes an Application Programming Interface (API). In one embodiment, the agent is a downloadable agent. In one embodiment, the new service profile includes a turbo service with higher data rate or throughput than a previous service profile of the broadband subscriber.

In one embodiment, the new service profile is accessed by one of: Television (TV); Personal computer (PC); Tablet computing device; Mobile device; and Over The Top (OTT)

services including one or more of movies, TV shows, games provided by a third party vendor. In one embodiment, the method further comprises receiving WAN performance information from the agent, wherein the LAN is coupled by another device to a WAN.

In one embodiment, the method further comprises: storing the WAN performance information in the database associated with the server; analyzing the WAN performance information; determining a new service profile for the broadband subscriber according to the received and analyzed WAN performance information; and reporting the new service profile to the broadband subscriber and the broadband subscriber's service provider. In one embodiment, the method further comprises: collecting the WAN performance information; performing statistical analysis using a first WAN performance information; and generating instruction and commands according to the statistical analysis for at least one of the broadband subscriber, networking equipment at the broadband subscriber's premises, the service provider of the broadband subscriber and the access equipment of the service provider.

In one embodiment, the method further comprises computing throughput of DSL connection by collecting current performance metrics associated with DSL service. In one embodiment, computing throughput is performed with reference to a website. In one embodiment, the throughput computation comprises probing a network. In one embodiment, the agent is executable in a virtual machine on the computing device. In one embodiment, the agent is dynamically downloaded to the computing device.

In one embodiment, reporting the analysis result comprises at least one of: sending statistical analysis including throughput; sending availability of higher bandwidth for operating a DSL service; sending purchase information for improving DSL service performance; or sending utilization information for optimizing a consumers DSL service cost.

In one embodiment, the WAN performance information includes at least one of: topological information; geographical information; time; throughput; latency; jitter; packet loss; type of communication device; device network identification; manufacturer and model of equipment; equipment characteristics; firmware; user's network usage pattern; RF characteristics including at least one of: signal power, frequency bands and mode of operation; environment statistics; or data on operation of communication devices.

In one embodiment, the method further comprises: receiving an on-demand change request associated with at least one of: throughput, or latency. In one embodiment, the computing device is one of: an access point (AP); a base station; a wireless smartphone device; a wireless LAN device; an access gateway; a router; a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the method further comprises: analyzing received user preference data and WAN performance information; determining an operational profile for the broadband subscriber in response to the analysis; and sending the operational profile to the agent of the broadband subscriber and the broadband subscriber's service provider.

In another example, an apparatus for implementing user preference of a broadband service is provided. In one embodiment, the apparatus comprises: a database; and a server coupled to the database, the server operable to: receive user preference data, associated with a broadband service, from an agent, wherein the agent is executable on a computing device coupled to a LAN of a broadband subscriber; receive WAN performance information, wherein the LAN is coupled by another device to a WAN; analyze the received user preference data and WAN performance information; determine an operational profile for the broadband subscriber in response to the analysis; send the operational profile to the agent of the broadband subscriber and the broadband subscriber's service provider.

In one embodiment, the user preference data includes one or more of: data services that a user of the broadband service uses; or applications that the user of the broadband service uses. In one embodiment, the user is one of: broadband user; Over The Top (OTT) services user; online shopper; voice over IP user; or game player. In one embodiment, the user preference data is accessed for the server by one of: Television (TV); Personal computer (PC); Tablet computing device; Mobile device; and Over The Top (OTT) services including one or more of movies, TV shows, games provided by a third party vendor.

In one embodiment, the computing device is one of: an access point (AP); a base station; a wireless smartphone device; a wireless LAN device; an access gateway; a router; a performance enhancement device; a Digital Subscriber Line (DSL) Customer Premises Equipment (CPE) modem; a cable CPE modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the WAN performance information includes at least one of: topological information; geographical information; time; throughput; latency; jitter; packet loss; type of communication device; device network identification; manufacturer and model of equipment; equipment characteristics; firmware; user's network usage pattern; RF characteristics including at least one of: signal power, frequency bands and mode of operation; environment statistics; or data on operation of communication devices.

In one embodiment, the agent includes an Application Programming Interface (API). In one embodiment, the agent is a downloadable agent.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus for recommending a service profile, the apparatus comprising:
    a database; and
    a server coupled to the database, the server operable to:
        receive broadband data from an agent, wherein the agent is executable on a computing device coupled to a LAN of a broadband subscriber, the broadband data comprises user usage data;
        store the received broadband data into the database;
        identify a current service profile of the broadband subscriber;
        analyze the stored broadband data in view of the current service profile, the analysis comprises comparing the user usage data to benchmark data, the benchmark data determined by analyzing at least usage data of users in a common geographical area;
        determine a new service profile for the broadband subscriber according to the analyzed broadband data; and
        recommend the new service profile to the broadband subscriber and the broadband subscriber's service provider.

2. The apparatus of claim 1, wherein the broadband data comprises at least one of WAN performance information or LAN performance data.

3. The apparatus of claim 2, wherein the WAN performance information includes at least one of:
    topological information;
    geographical information;
    time;
    throughput;
    latency;
    jitter;
    packet loss;
    type of communication device; device network identification;
    manufacturer and model of equipment; equipment characteristics;
    firmware;
    user's network usage pattern;
    RF characteristics including at least one of: signal power, frequency bands and mode of operation;
    environment statistics; or
    data on operation of communication devices.

4. The apparatus of claim 1, wherein the agent includes an Application Programming Interface (API).

5. The apparatus of claim 1, wherein the agent is a downloadable agent.

6. The apparatus of claim 1, wherein the server is operable to dynamically adjust a service profile of the broadband subscriber with the new service profile.

7. The apparatus of claim 1, wherein the new service profile includes a turbo service with higher data rate or throughput than a previous service profile of the broadband subscriber.

8. The apparatus of claim 1, wherein the new service profile is accessed by one of:
    Television (TV);
    Personal computer (PC);
    Tablet computing device;
    Mobile device; or
    Over The Top (OTT) services including one or more of movies, TV shows, games provided by a third party vendor.

9. The apparatus of claim 1, wherein the server is operable to receive WAN performance information from the agent, wherein the LAN is coupled by another device to a WAN.

10. The apparatus of claim 9, wherein the server is operable to:
    store the WAN performance information in the database associated with the server;
    analyze the WAN performance information;
    determine a new service profile for the broadband subscriber according to the received and analyzed WAN performance information; and
    report the new service profile to the broadband subscriber and the broadband subscriber's service provider.

11. The apparatus of claim 9, wherein the server comprises:
    a first module for collecting the WAN performance information;
    a second module for performing statistical analysis using a first WAN performance information; and
    a third module for generating instruction and commands according to the statistical analysis for at least one of the broadband subscriber, networking equipment at the broadband subscriber's premises, the service provider of the broadband subscriber and the access equipment of the service provider.

12. The apparatus of claim 1, wherein the server comprises a management interface for communicating with the agent via internet.

13. The apparatus of claim 1, wherein the server is operable to compute throughput of DSL connection by collecting current performance metrics associated with DSL service.

14. The apparatus of claim 13, wherein the server to perform throughput computation with reference to a website, and wherein the throughput computation comprises probing a network.

15. The apparatus of claim 1, wherein the agent is executable in a virtual machine on the computing device, and/or wherein the agent is dynamically downloaded to the computing device.

16. The apparatus of claim 1, wherein the server is operable to report a result from analysis by performing at least one of:
    sending statistical analysis including throughput;
    sending availability of higher bandwidth for operating a DSL service;
    sending purchase information for improving DSL service performance; or
    sending utilization information for optimizing a consumers DSL service cost.

17. The apparatus of claim 1, wherein the server is operable to receive an on-demand change request associated with at least one of: throughput, or latency.

18. The apparatus of claim 1, wherein the computing device is one of:
    an access point (AP); a base station;
    a wireless smartphone device; a wireless LAN device;
    an access gateway; a router;
    a performance enhancement device;
    a Digital Subscriber Line (DSL) Customer Premises Equipment (CPE) modem;
    a cable CPE modem;

an in-home powerline device;
a Home Phoneline Network Alliance (HPNA) based device;
an in-home coax distribution device;
a G.hn (Global Home Networking Standard) compatible device;
an in-home metering communication device;
an in-home appliance communicatively interfaced with the LAN;
a wireless femtocell base station;
a wireless WiFi compatible base station;
a wireless mobile device repeater;
a wireless mobile device base station; nodes within an ad-hoc/mesh network;
a set-top box (STB)/set-top unit (STU) customer electronics device;
an Internet Protocol (IP) enabled television;
an IP enabled media player;
an IP enabled gaming console;
an Ethernet gateway;
a computing device connected to the LAN;
an Ethernet connected computer peripheral device;
an Ethernet connected router;
an Ethernet connected wireless bridge;
an Ethernet connected network bridge; or
an Ethernet connected network switch.

19. The apparatus of claim 1, wherein the server resides in a cloud.

20. The apparatus of claim 1, wherein the server is operable to store the WAN performance information with an associated timestamp, and wherein the agent is operable to collect LAN performance data from at least one of the computing device or another device coupled to the LAN.

21. A method performed by the apparatus of claim 1 for recommending a service profile.

22. An apparatus for implementing user preference of a broadband service, the apparatus comprising:
a database; and
a server coupled to the database, the server operable to:
receive user preference data, associated with a broadband service, and user usage data from an agent, wherein the agent is executable on a computing device coupled to a LAN of a broadband subscriber;
receive WAN performance information, wherein the LAN is coupled by another device to a WAN;
store the received user preference data WAN performance information into the database;
analyze the stored user preference data, user usage data, and WAN performance information, the analysis comprises comparing the user usage data to benchmark data, the benchmark data determined by analyzing at least usage data of users in a common geographical area;
determine an operational profile for the broadband subscriber in response to the analysis; and
send the operational profile to the agent of the broadband subscriber and the broadband subscriber's service provider.

23. The apparatus of claim 22, wherein the user preference data includes one or more of:
data services that a user of the broadband service uses; or
applications that the user of the broadband service uses.

24. The apparatus of claim 22, wherein the agent includes an Application Programming Interface (API), and wherein is a downloadable agent.

* * * * *